United States Patent

[11] 3,614,493

| [72] | Inventors | Harold E. Collings<br>Schenectady;<br>William L. Darby, Scotia, both of N.Y. |
|---|---|---|
| [21] | Appl. No. | 6,902 |
| [22] | Filed | Jan. 29, 1971 |
| [45] | Patented | Oct. 19, 1971 |
| [73] | Assignee | General Electric Company |

[54] UNIVERSAL LIQUID-COOLED CONNECTION ASSEMBLY
7 Claims, 5 Drawing Figs.

[52] U.S. Cl.................................................. 310/54,
310/58, 310/64
[51] Int. Cl..................................................... H02k 9/00
[50] Field of Search........................................ 310/54, 58,
59, 61, 64, 65, 260, 270, 273; 29/157.5, 157.6

[56] References Cited
UNITED STATES PATENTS

| 2,695,368 | 11/1954 | Kilbourne...................... | 310/64 |
| 2,742,583 | 4/1956 | Beckwith...................... | 310/64 |
| 3,097,317 | 7/1963 | Fechheimer................... | 310/54 |
| 3,131,321 | 4/1964 | Gibbs............................ | 310/64 |
| 3,185,872 | 5/1965 | Weissheimer.................. | 310/64 |

Primary Examiner—Milton O. Hirshfield
Assistant Examiner—R. Skudy
Attorneys—William C. Crutcher, Frank L. Neuhauser, Oscar B. Waddell and Joseph B. Forman ABSTRACT: A connector assembly to connect liquid-cooled stator bars in a dynamoelectric machine. First and second headers attached to the juxtaposed ends of a pair of stator bars are jointed by means of rotatable, telescoping joints to fittings having mating cylindrical surfaces. The fittings are further aligned by sliding the cylindrical surfaces upon one another, and then brazed together. In a second embodiment, two joints each comprising a pair of mating cylindrical surfaces generated about perpendicular axes provide an additional degree of freedom between the fittings to compensate for restricted movement at one of the rotatable telescoping joints in certain header orientations.

INVENTORS:
HAROLD E. COLLINGS,
WILLIAM L. DARBY,

BY *W.C. Cutcher*

THEIR ATTORNEY.

PATENTED OCT 19 1971

INVENTORS:
HAROLD E. COLLINGS,
WILLIAM L. DARBY,

BY *W. C. Crutcher*

THEIR ATTORNEY.

PATENTED OCT 19 1971 3,614,493
SHEET 3 OF 3
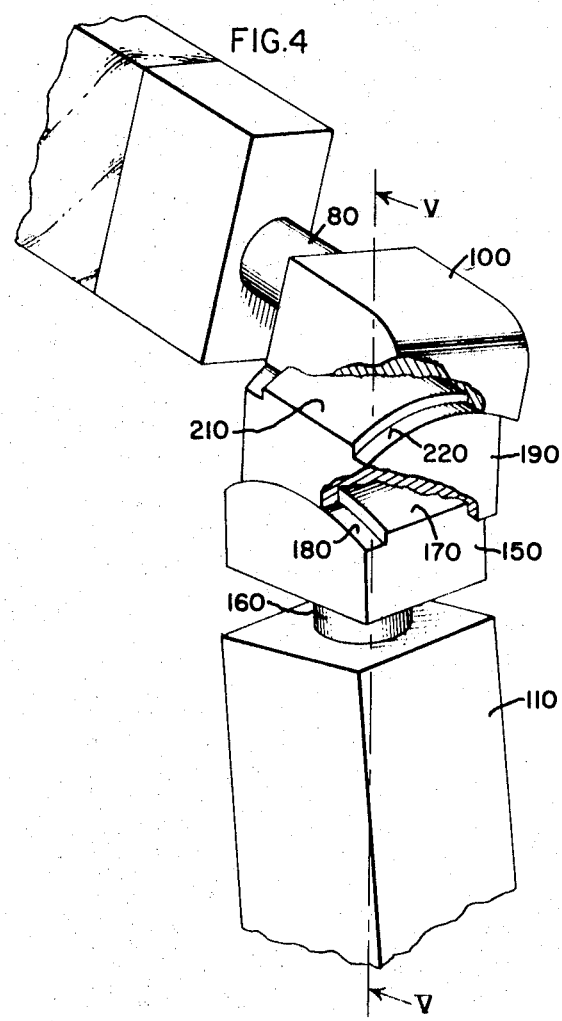
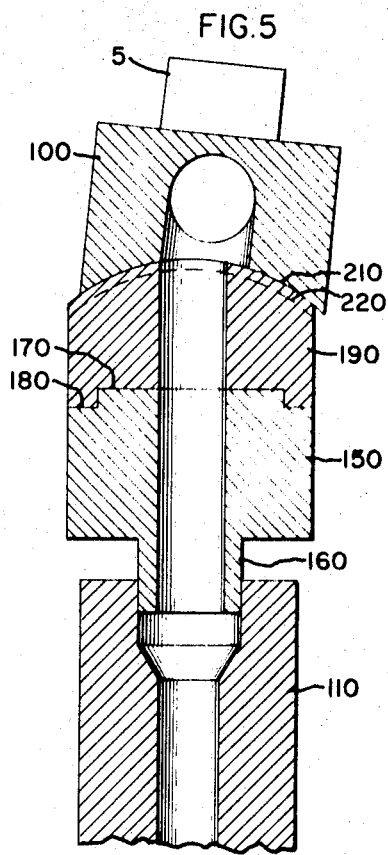
INVENTORS:
HAROLD E. COLLINGS,
WILLIAM L. DARBY,
BY W. C. Cutter
THEIR ATTORNEY.

UNIVERSAL LIQUID-COOLED CONNECTION ASSEMBLY

BACKGROUND OF THE INVENTION

This invention relates to fluid-cooled windings of dynamoelectric machines, and more particularly, to means for electrically and hydraulically interconnecting stator bars comprising such windings.

In the construction of modern large-capacity turbine generators, the cooling of the windings in which power is generated has become a significant problem. One method which enjoys wide popularity is the use of hollow conductors for the stator bars which comprise the stator windings, the hollow conductors providing a path for the flow of liquid coolant therethrough.

At the end of each winding element, or stator bar, it is necessary to provide means to complete the electrical and hydraulic circuits required for current and coolant flow, respectively. In the prior art many means have been devised to electrically unite stator bars while providing a conduit for the flow of coolant therebetween. In some apparatus the connection takes the form of a rigid, fluid-conducting member made of a material having good electrical conductivity. In other cases means are provided to establish separate paths for current and fluid flow. Due to the large amounts of current involved, along with the necessity for mechanical strength, the connectors have necessarily been heavy, rigid devices. The stator bars, on the other hand, are susceptible to misalignment caused by distortion during manufacture and assembly in the stator, before the aforesaid connectors can be applied. For this reason, many efforts have been made to devise connectors which would accommodate misaligned stator bars, while providing the requisite mechanical strength and electrical conductivity.

SUMMARY OF THE INVENTION

The present invention comprises a connector assembly consisting of several interfitting parts which are brazed together after having been attached to the ends of a pair of stator bars and brought into alignment with one another. To compensate for the anticipated misalignment of the bars, a pair of abutting connector components are provided with mating surfaces of a cylindrical configuration. Before brazing, the juxtaposed cylindrical surfaces are allowed to slide against one another to accommodate misalignment existing in a plane perpendicular to the axis about which the aforesaid cylindrical surfaces are generated. Since misalignment may occur in other planes, a second embodiment of the subject invention provides a series of mating members which abut on two cylindrical surfaces generated about mutually perpendicular axes. Misalignment perpendicular to both of the aforementioned axes is accommodated by concentric, telescoping members. All mating components of the connector are hollow to allow coolant to flow therethrough, and made of a material having good electrical conductivity to provide the necessary electrical connection between the stator bars. After the components of the connector are aligned, they are brazed together and the assembly solidifies into a single structure having the necessary strength and rigidity.

It is therefore an object of this invention to provide an electrically conductive, fluid-conducting connector which will accommodate severe misalignment between the elements which it couples.

It is a further object of this invention to provide a rigid coupling for fluid-cooled stator bars which constitutes a path for both current and coolant flow, and accommodates misalignment between said stator bars.

BRIEF DESCRIPTION OF THE DRAWINGS

FIG. 4 shows a further embodiment of the connector which compensates for angular misalignment in two planes; and FIG. 5 is a sectional view of the embodiment of FIG. 4 taken on lines 5—5.

DESCRIPTION OF THE PREFERRED EMBODIMENT

Figure 1:
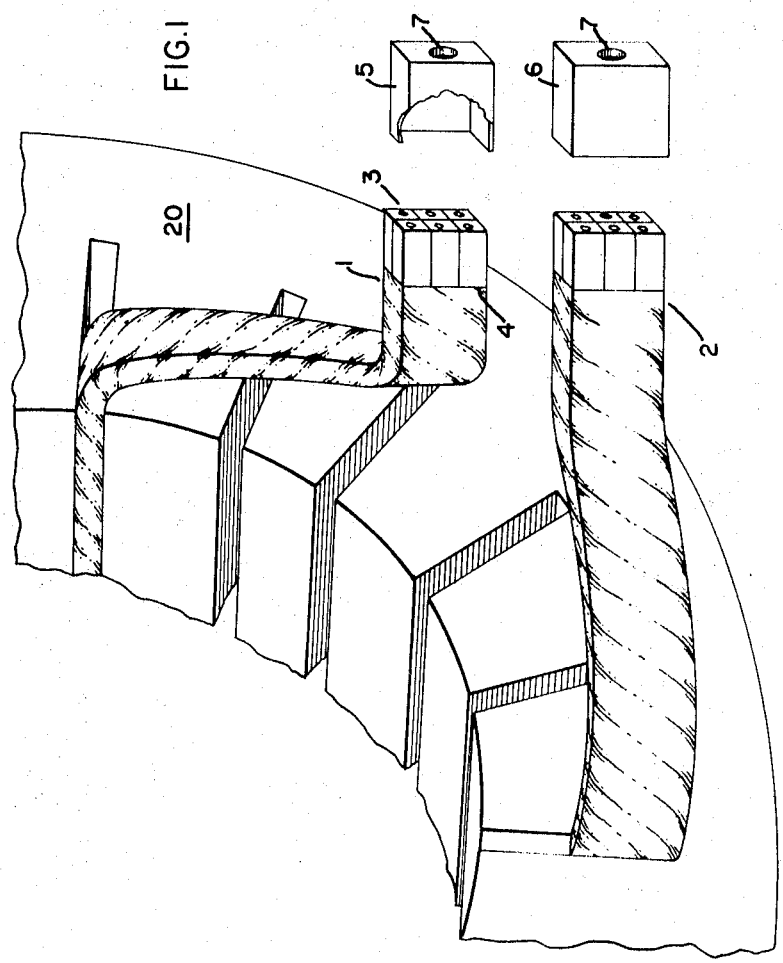
FIG. 1 shows an exploded view of a universal connector assembly and associated stator bars.

Referring now to FIG. 1, stator bars 1 and 2, each comprising a plurality of aligned hollow conductors 3 surrounded by insulation 4, are inserted into the slots of a generator stator core generally indicated at 20. Headers 5 and 6, made of a conducting material such as copper, are adapted to slip over the protruding conductors 3. A fluidtight, electrically conducting joint is provided by brazing the conductors within the headers. Each header is provided with a passage 7, which takes the form of a cylindrical opening of a diameter suitable to slidingly receive tubes 8 and 9 extending from upper and lower fittings 10 and 11 respectively. Upper and lower fittings 10 and 11 are connected by connector block 15. The upper surfaces of the connector block are cylindrical, and mate with similarly curved cylindrical surfaces which form the bottom of upper fitting 10. Tube 16 extends from the lower portion of the connector block and is slidingly received in an orifice in the top of lower fitting 11.

Figure 2:
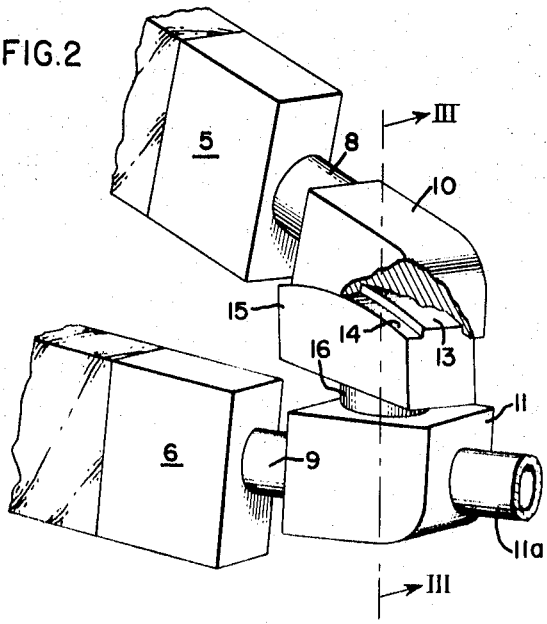
FIG. 2 illustrates such a connector assembled to misaligned stator bars.

FIG. 2 shows, in greater detail, the component parts of the embodiment of the connector assembly shown in FIG. 1. Upper fitting 10, preferably made from a metal having good electrical conductivity characteristics, is provided with a passage extending from an orifice in its lower, cylindrical surface to the interior of tube 8. The lower surfaces of fitting 10 mate with correspondingly curved surfaces 13 and 14 at the top of connector block 15. Surface 13 is cylindrical in that it has a constant radius of curvature. On either side of surface 13 are cylindrical surfaces 14 which are generated about a common axis with surface 13 but have a shorter radius of curvature. The discontinuities between the surfaces constitute a pair of ridges, or shoulders, which prevents lateral displacement of upper fitting 10 on a mating surface of connector block 15 but allows the abutting curved surfaces to slide in an arc parallel to the curvature of the surfaces.

Figure 3:
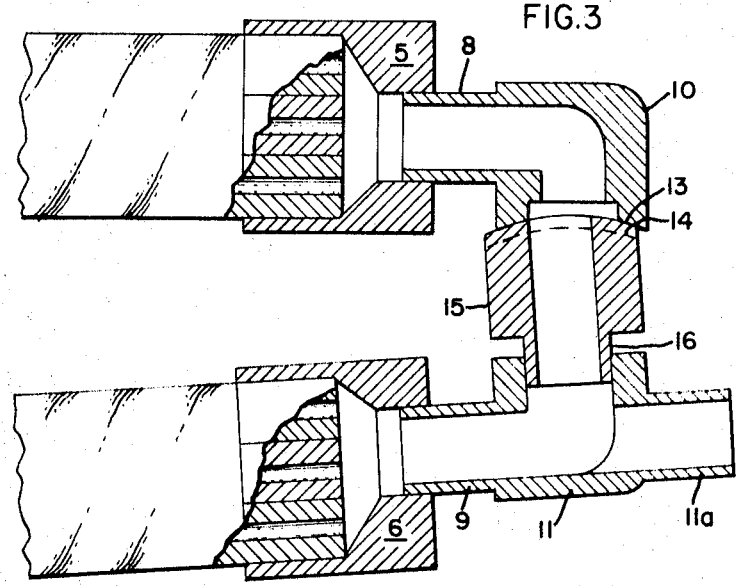
FIG. 3 is a sectional view of the connector assembly of FIG. 2 taken on lines 3—3.

Referring now to FIG. 3, the passages through upper and lower fittings 10 and 11 respectively are clearly evident, as is the passage running longitudinally through connector block 15 which provides a path for fluid flowing between the fittings. Extending horizontally from lower fitting 11 is tube 9 which is slidingly received in header 6. The interior of tube 9 comprises a first portion of a passageway which extends into the body of the fitting and terminates at an orifice in the upper surface thereof. Slidingly received in this orifice is tube 16 which comprises the lower portion of connector block 15. The interior of tube 16 comprises part of a passageway which extends through connector block 15 and terminates at an orifice in the upper surface thereof. As set forth above, the upper surfaces of connector block 15 comprise coaxial cylindrical surfaces which mate with surfaces of corresponding radii at the bottom of upper fitting 10. Tube portion 8 connects the interior of fitting 10 with upper header 5.

It will be seen that if, due to misalignment of headers 5 and 6, the axes of tubular elements 8 and 9 are skewed such misalignment may be compensated for by the rotation of tube 16 in the orifice of lower fitting 11, and by the sliding of curved surfaces 13 and 14 of upper fitting 10 over the mating surfaces at the top of connector block 15.

Referring again to FIG. 2, it will be seen that the curved surfaces of connector block 15 and upper fitting 10 remain in close engagement, although the components are misaligned. Once the components have been brought together in the manner shown, they may be permanently united. One way of uniting them which has been found to be satisfactory is by clamping the components tightly together and silver soldering or brazing the joints after heating the connector by means of induction heating apparatus, acetylene torch, or by resistance heating. Due to the intimate contact of the various mating surfaces, particularly those of the tubular members within their receiving orifices and of curved surfaces 13 and 14, with the corresponding surfaces of fitting 10, capillary action draws the molten joining metal between the surfaces and produces a strong, electrically conductive bond therebetween.

In FIG. 4 is shown a second embodiment of a universal connector which is capable of compensating for still further misalignment of stator bars. Upper fitting 100 is provided with horizontally extending tube element 80. A passageway for the conduction of fluid extends axially through the tube and terminates at an orifice in a lower surface of the fitting, perpendicular to the tube axis. Interposed between fitting 100 and bar 110 is connector block 150 and adapter block 190. It will be seen that connector block 150 is provided with a tube 160 extending downwardly therefrom, which is slidingly received in an orifice in the upper surface of lower fitting 110. The upper surface of connector block 150 is provided with coaxial cylindrical surfaces 170 and 180, a passageway communicating with the interior of tube 160 terminating at an orifice thereon. A corresponding passageway extends throughout adapter block 190 to allow fluid flow between connector block 150 and upper fitting 100.

It will be seen that the axis about which the upper curved surfaces 170 and 180 of connector block 150 are generated are at right angles to the axis about which the lower surfaces of upper fitting 100 are generated. To connect the two, adapter block 190 is interposed between the surfaces. The upper surfaces 210, 220 of adapter block 190 are cylindrical and form shoulders at their junction in the same manner as the lower surfaces of upper fitting 100; and the lower surfaces of the adapter block are also cylindrical and correspond to the curved surfaces 170, 180 and shoulders of connector block 150. The axes about which the upper and lower surfaces of adapter block 190 are generated are at right angles to one another so that the lower surfaces of the adapter block are mated with the curved surfaces of fitting 150, and the upper surfaces of the adapter block with the lower curved surfaces of upper fitting 100.

Referring now to FIG. 5, angular misalignment between adapter block 190 and connector block 150, being perpendicular to the plane of the section, is not apparent; however, the misalignment between upper fitting 100 and adapter block 190 is clearly seen. Fitting 100 is allowed to slide about a first axis over the mating, upper surfaces 210, 220 of adapter block 190 to accommodate the misalignment. Nonetheless, the mating surfaces remain in close engagement, facilitating a good bond therebetween. Similarly, the abutting surfaces between adapter block 190 and connector block 150 remain in close engagement, the adapter block having been allowed to slide along the top of the connector block to compensate for misalignment about a second axis. As will be understood by those skilled in the art, the discontinuities between the parallel cylindrical surfaces result in shoulders which allow mating surfaces to slide in one plane but do not allow any motion transverse thereto. In this manner, the joint is provided with considerable mechanical strength, and resists undesired lateral displacement. Further, the assembly of the components of the universal connector assembly before brazing is facilitated by the presence of such shoulders in that juxtaposed members may only slide in a single plane.

Referring back to FIG. 4, it will be seen that the connector shown therein will accommodate misalignment in the same directions as will the first-described connector shown in FIG. 2. Further, should the presence of obstructions make it impossible for upper and lower fittings 100 and 110 be twisted about the axes of tubes 80 or 160 in order to align the components of the connectors such angular misalignment will be compensated for by the sliding of the upper curved surfaces 210, 220 of adapter block 190 upon the mating lower curved surfaces of upper fitting 100.

It will thus be seen that the universal connector of FIG. 4 will accommodate misalignment of the stator bars in any direction, within limits dictated only by the physical dimensions of the particular components utilized. Once the components are mated to the headers and assembled they may be fused together in any suitable manner. Preferably, the mating components may be clamped together, heated to a suitable temperature, and brazed into a unitary structure. The intimate contact of the closely fitting surfaces supports a capillary action which draws molten joining metal between the surfaces, producing a joint of the desired electrical and mechanical integrity.

While various modifications have been illustrated with respect to the universal connector herein disclosed, it will be obvious to those skilled in the art that still other modifications are feasible; and it is desired to include by the appended claims all such modifications as fall within the true spirit and scope of the invention.

What is claimed and desired to be secured by Letters Patent of the United States is:

1. In a dynamoelectric machine having armature windings which comprise a plurality of conducting members defining passages for the flow of liquid coolant therein, coupling means to provide for conducting coolant and current between pairs of said conducting members, comprising:

a first fitting adapted for rotatable and slidable connection with respect to a first axis to a first conducting member, said fitting having a first curved surface generated at a first distance about a line, said fitting further having a passageway for coolant flow extending therethrough and terminating at said first curved surface;

a connector block having a second curved surface generated at said first distance about a line for mating with said first curved surface of said first fitting and providing for the rotation thereof about a second axis perpendicular to said first axis, said connector block further having a tube extending therefrom, said mating surface of said tube being connected by a passageway for conducting a flow of coolant;

a second fitting adapted for connection to a second conducting member, said second fitting having a passageway extending therethrough for conducting a flow of coolant, one end of said passageway being adapted to slidingly and rotatably receive said tube extending from said connector block for allowing rotation of said connector block about a third axis perpendicular to said second axis.

2. In a dynamoelectric machine having armature windings which comprise a plurality of stator bars, each of said bars comprising a plurality of juxtaposed hollow conductors for carrying a flow of coolant therein, coupling means to provide for conducting current and coolant therebetween, comprising:

a. a first fitting adapted for adjustable connection to a first stator bar, said fitting having a first curved surface generated at a first distance about a line, said fitting further having a passageway for conducting coolant flow extending therethrough and terminating at said first curved surface;

b. a connector block having a second curved surface generated at said first distance about a line for mating with said first surface of said first fitting, said connector block further having a tube extending therefrom, and having a passageway extending through said tube terminating at said second curved surface; and c. a second fitting adapted for adjustable connection to a second stator bar, said second fitting having a passageway extending therethrough for conducting a flow of coolant, one end of said passageway being adapted to slidably and rotatably receive said tube extending from said connector block.

3. Coupling means as recited in claim 2 wherein said first and second fittings are provided with hollow tubular ends, and further including a first header having a first end adapted for connection to the conductors of said first stator bar and a second end adapted to slidably and rotatably receive said tubular end of said first fitting; and a second header having a first end adapted for connection to the conductors of said second stator bar and a second end adapted to slidable and rotatably receive the tubular end of said second fitting.

4. Coupling means according to claim 3, wherein said tubes, tubular ends and curved surfaces are rigidly joined to their mating surfaces by a brazed connection.

5. Coupling means as recited in claim 2, wherein said first fitting is provided with an additional curved surface adjacent to said first curved surface and generated at a second distance about the same line, and wherein said connector block is provided with an additional curved surface adjacent to said second curved surface and generated at said second distance about the same line for mating with said additional curved surface of said first fitting, whereby relative movement of said first fitting and said connector block in a direction parallel to said lines is prevented.

6. In a dynamoelectric machine whose armature windings comprise a plurality of conducting bars, at least one of said bars comprising a stator bar having a plurality of juxtaposed hollow conductors for carrying a flow of coolant therein, means for coupling pairs of said bars for conducting current and coolant therebetween comprising:
   a. a first fitting having inlet means adapted to receive coolant from the conductors of one of a pair of said bars and having a curved surface of a first radius of curvature, said first radius extending from a first axis said curved surface having an outlet orifice therein;
   b. an adapter block having a curved upper surface of said first radius of curvature, said surface being adapted to mate with said curved surface of said first fitting, said adapter block further having a curved lower surface of a second radius of curvature, said second radius extending from a second axis which is perpendicular to said first axis, said upper and lower surfaces being connected by a passage extending through said adapter block;
   c. a connector block having a curved upper surface of said second radius of curvature, said surface being adapted to mate with said lower surface of said adapter block, said connector block further having a tube extending therefrom, said upper surface and said tube being connected by a passage extending through said connector block; and
   d. a second fitting having a passage extending therethrough, one end of said passage defining an orifice for slidably receiving said tube extending from said connector block, and having outlet means adapted to transmit a flow of coolant to said other of said pair of conducting bars.

7. In a dynamoelectric machine whose armature windings comprise a plurality of conducting bars, at least one of said bars comprising a stator bar having a plurality of juxtaposed hollow conductors for carrying a flow of coolant therein, means for coupling pairs of said bars to provide for conducting current and coolant therebetween comprising:
   a. a first fitting having inlet means adapted to receive coolant from the conductors of one of a pair of said bars and having a curved surface of a first radius of curvature and having an outlet orifice therein, said surface having adjacent thereto curved surfaces of a second radius of curvature, said radii extending from a first common axis;
   b. an adapter block having a curved upper surface of said first radius of curvature, said surface having adjacent thereto curved surfaces of said second radius of curvature, said radii extending from a common axis, said surfaces being adapted to mate with said curved surfaces of said first fitting, said adapter block further having a curved lower surface of a third radius of curvature, said surface having adjacent thereto curved surfaces of a fourth radius of curvature, said third and said fourth radii extending from a second common axis which is perpendicular to said first common axis, said upper and lower surfaces being connected by a passage extending through said adapter block;
   c. a connector block having a curved upper surface of said third radius of curvature, said surface having adjacent thereto curved surfaces of said fourth radius of curvature, said radii extending from a common axis, said surfaces being adapted to mate with lower surfaces of said adapter block, said connector block further having a tube extending therefrom, one of said upper surfaces and said tube being connected by a passage extending through said connector block; and
   d. a second fitting having a passage extending therethrough, one end of said passage defining an orifice for slidably receiving said tube extending from said connector block, and having outlet means adapted to transmit a flow of coolant to said other of said pair of conducting bars.